J. L. FAY.
AUTOMOBILE.
APPLICATION FILED OCT. 21, 1907.
909,073.
Patented Jan. 5, 1909.
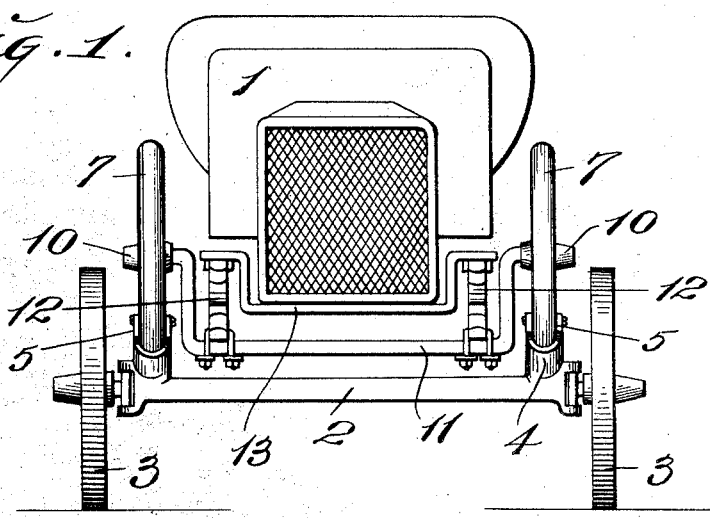
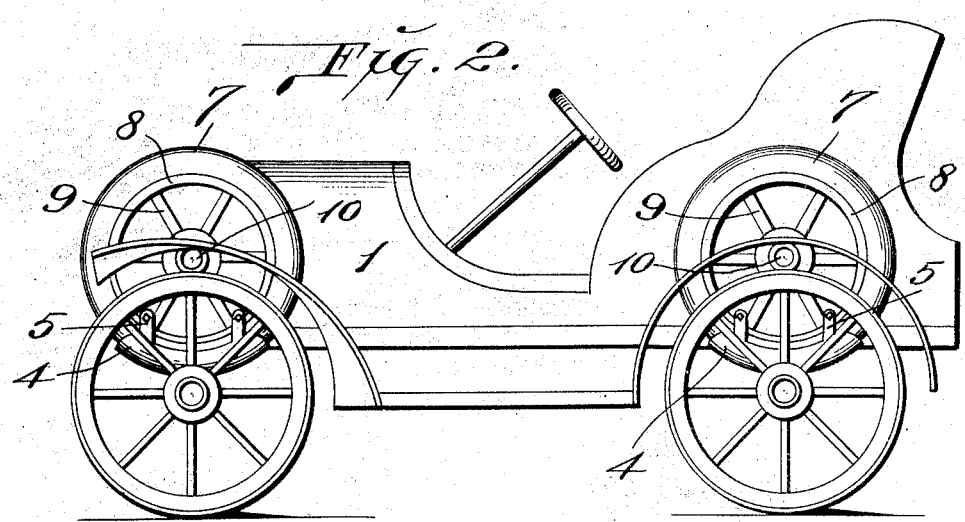
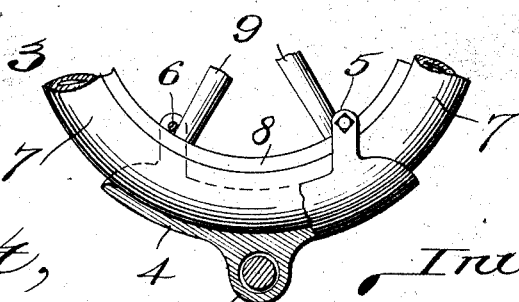
Attest,
M. T. Smith
E. M. Harrington
Inventor,
John L. Fay.
By Higdon & Longan
Attys.

UNITED STATES PATENT OFFICE.

JOHN L. FAY, OF ST. LOUIS, MISSOURI, ASSIGNOR OF ONE-HALF TO FREDERICK A. WORTHINGTON, OF ST. LOUIS, MISSOURI.

AUTOMOBILE.

No. 909,073.  Specification of Letters Patent.  Patented Jan. 5, 1909.

Application filed October 21, 1907. Serial No. 398,352.

*To all whom it may concern:*

Be it known that I, JOHN L. FAY, a citizen of the United States, and resident of St. Louis, Missouri, have invented certain new and useful Improvements in Automobiles, of which the following is a specification, containing a full, clear, and exact description, reference being had to the accompanying drawings, forming a part hereof.

My invention relates generally to automobiles and the like, and more particularly to a shock absorbing means which is located between the body and the frame of an automobile or motor vehicle, my object being to locate a plurality of pneumatic cushions between the frame and body of the vehicle, thus providing for the absorption and elimination of all vibration and jar to the body of the vehicle, thus permitting the same to be mounted upon wheels having ordinary rims and tires.

By my improved construction, a motor vehicle or the like may be equipped with wheels having the ordinary wheel tire, which greatly outwear pneumatic tires, and the body of the vehicle being mounted on pneumatic cushions rides with the same easy movement as though ordinary pneumatic tires were in use upon the axles of the vehicle.

To the above purposes, my invention consists in certain novel features of construction and arrangement of parts, which will be hereinafter more fully set forth, pointed out in the claims, and illustrated in the accompanying drawings, in which:—

Figure 1 is a front elevation of a vehicle of my improved construction; Fig. 2 is a side elevation of the vehicle; Fig. 3 is a detail view, partly in section, and showing one of the saddles carried by the vehicle axles, and which supports one of the pneumatic cushions.

Referring by numerals to the accompanying drawings:—1 designates the sills or frame or the vehicle, 2 the axles, and 3 the wheels which are mounted on the axles in the usual manner, and said wheels being of ordinary construction and provided with metal rims or tires.

Formed on or fixed to each axle, adjacent its ends, are the saddles 4, which are of such form as to receive and hold the pneumatic cushions; and in the present instance as the cushions are in the form of inflatable rings, the saddles are curved both longitudinally and in cross section.

Formed integral with the sides of the saddles, at the ends thereof, are ears 5, through the upper ends of which pass bolts 6, thus providing means for locking the frames of the cushions to the saddles.

7 designates the cushions, which are in the form of inflatable rings, such as ordinary pneumatic tires, the same being held in frames comprising rims 8 and spokes 9, the latter being fixed in hubs 10; and passing through said hubs are the ends of transversely disposed drop bars 11. Fixed on said drop bars are ordinary elliptical springs 12; and mounted on top of said springs are the ends of cross bars, such as 13, which support the body 1 of the vehicle.

When the parts of a vehicle of my improved construction are assembled for use, the cushions 7 rest on the saddles 4, and the frames of the cushions, comprising the rims and spokes, are held by the bolts 6 which pass through the ears 5 carried by the saddles. As the vehicle is propelled, the wheels 3 travel on the ground, and all vibration or shocks due to the passage of said wheels over rough and uneven ground is eliminated by the cushioning effect of the members 7, which are arranged between the vehicle frame and body. As these cushions 7 are circular, or in the form of ordinary pneumatic tires, the force or strain of the vibration or shock is equally distributed around the bodies of said cushions; and, as a result, the body 1 of the vehicle is yieldingly supported, and will ride with an easy comfortable motion.

The cushioning members are preferably made in the form of ordinary pneumatic wheels, in order that they may be rotated whenever desired to bring a fresh bearing surface on to the saddle 4, thereby preventing the crystallization of the rubber in the pneumatic tires due to said tires remaining too long in one position.

The cushions may be made in various forms and sizes, but for ordinary motor vehicles, the best results are obtained where they are made in the form herein shown and described.

I claim:—

1. The combination with an automobile frame and body, of saddles arranged on the axles of the frame, inflatable rings adjustably arranged in the saddles, frames within the inflatable rings means on the saddles and engaging the frames to hold the inflatable rings against rotation in the saddles, and connections between the frames and the automobile body.

2. The combination with an automobile frame and body, of saddles arranged on the axles of the frame, inflatable rings adjustably arranged in the saddles, frames comprising rims, spokes and hubs arranged within the inflatable rings means arranged on the saddles and engaging between the spokes of the frames for holding the rings against rotation in the saddles, and connections between the automobile body and the hubs of the frames.

3. The combination with an automobile frame and body, of drop bars supporting the body, wheels journaled on the ends of the drop bars, inflatable rings on said wheels, skeleton frames within said rings saddles fixed on the axles of the automobile body, which saddles receive the inflatable rings, and bolts arranged at the ends of the saddles, and which bolts pass through the skeleton frames to hold the inflatable rings against rotation in the saddles.

In testimony whereof, I have signed my name to this specification, in presence of two subscribing witnesses.

JOHN L. FAY.

Witnesses:
M. P. SMITH,
E. L. WALLACE.